Sept. 10, 1957 P. MERCIER 2,805,853
OLEO-PNEUMATIC ENERGY DISSIPATING DAMPING DEVICE
Filed Oct. 17, 1952 4 Sheets-Sheet 1

INVENTOR
PIERRE MERCIER
BY
ATTY.

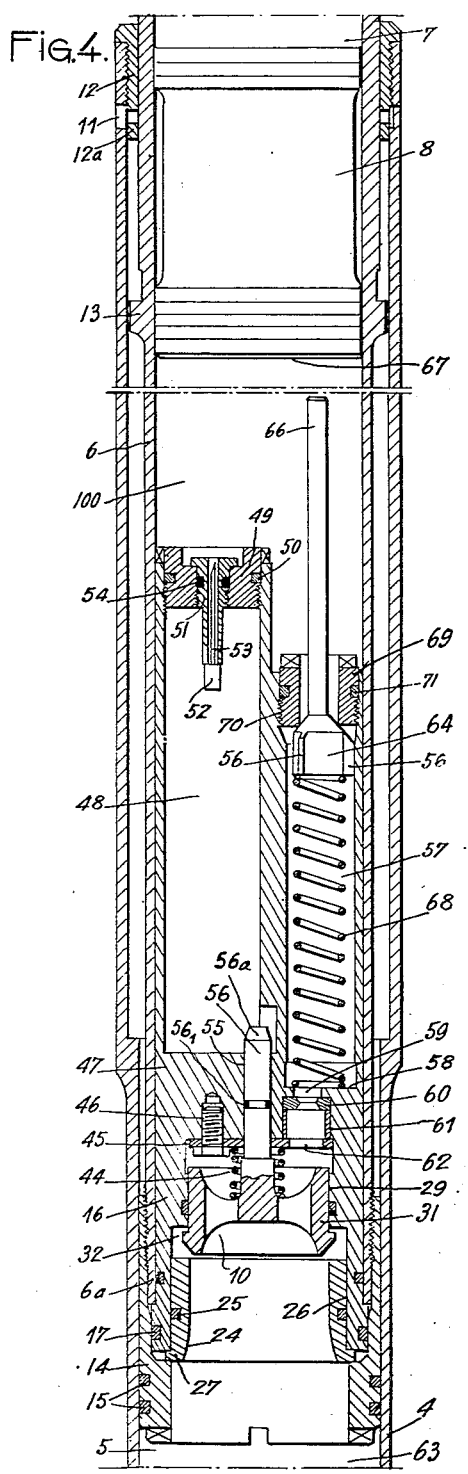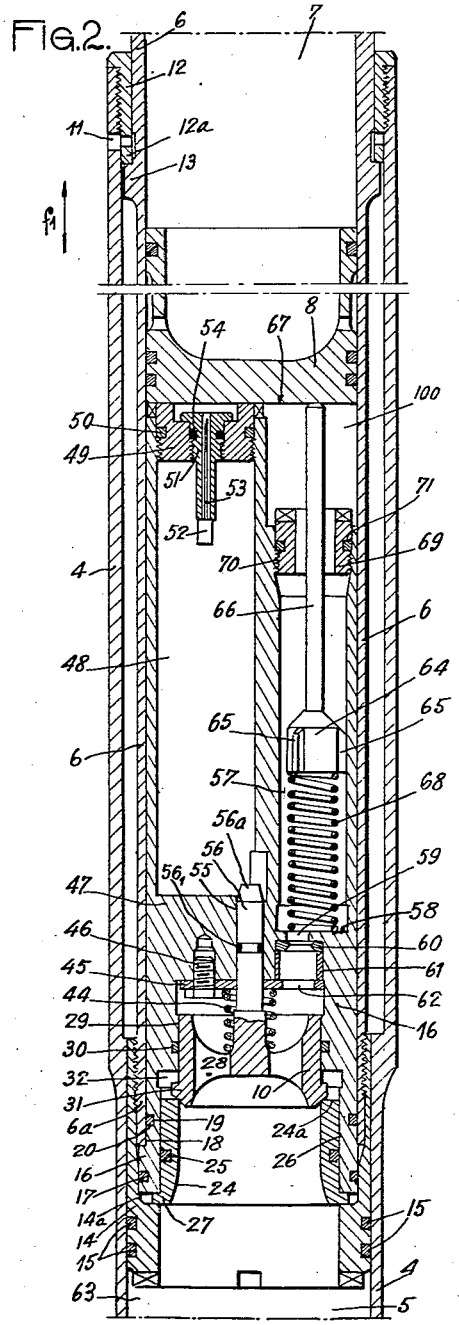

Sept. 10, 1957 — P. MERCIER — 2,805,853
OLEO-PNEUMATIC ENERGY DISSIPATING DAMPING DEVICE
Filed Oct. 17, 1952 — 4 Sheets-Sheet 4
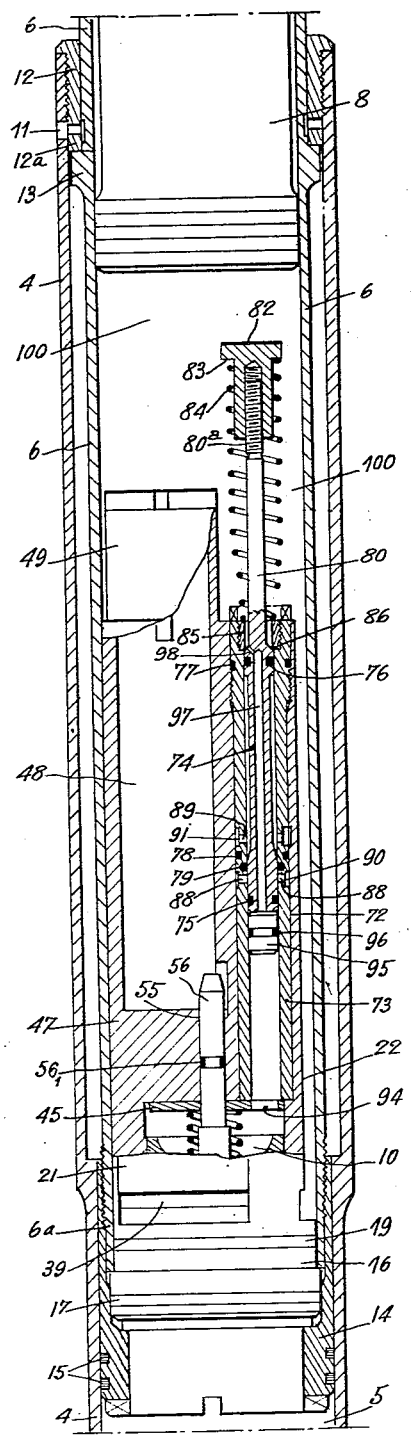
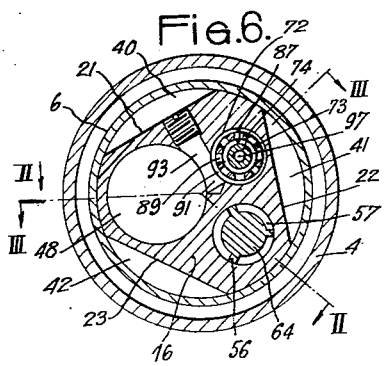
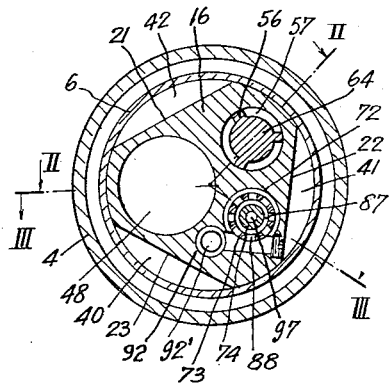
INVENTOR
PIERRE MERCIER

2,805,853

OLEO-PNEUMATIC ENERGY DISSIPATING DAMPING DEVICE

Pierre Mercier, Gennevilliers, France, assignor to Societe d'Etudes et de Constructions Aero-Navales, Gennevilliers, France, a company of France Application October 17, 1952, Serial No. 315,302

Claims priority, application France August 9, 1952

7 Claims. (Cl. 267—64)

An object of the present invention is a device dissipating an energy of any kind by laminating a liquid while ensuring, over its entire operating run, a reaction substantially proportional to the initial energy to be absorbed.

This device is applicable to any apparatus in which a violent impulse is transmitted directly to a mass of liquid; it is possible to realize it in a particularly advantageous manner in the shape of an aircraft landing damper in which it allows an optimum regulation of the absorption of the vertical energy of the aircraft over the entire run of this damper whose action is specially energetic at the instant of impact but which makes for a soft suspension during the taxiing of the aircraft.

A device of this type has been previously described in the American Patent No. 2,475,477 which relates to a landing shock absorber.

In the type of damper of the invention, it is desired to obtain a load-run diagram as close to a rectangle as possible, regardless of the energy to be absorbed. It is also desired to utilize the greater portion of the run of the damper even for low energies, so as to ensure a good suspension.

According to the invention two hollow tubular elements engaged telescopically inside one another contain, at their lower portions, a liquid separated from an upper chamber filled with compressed air, by a separating piston arranged substantially at the middle portion of the upper tubular element when the device is at its rest position, said piston being pushed upward against the action of the compressed air when the device is pushed in by the action of a shock, which causes part of the liquid to pass through an energy dissipating device associated with the lower portion of the upper telescopic element, said energy dissipating device comprising means whose action is so calculated that at the time of impact the liquid passes through an orifice with a very small section, then, at the end of the impact, this liquid is laminated between a valve and its seat, said valve having been loaded, previously, according to the violence of impact by the liquid itself, which is then allowed to pass, during the period corresponding to the taxiing, between said valve and its seat, this valve then being only partly balanced according to the pressure of the liquid which is above the dissipating device, a pressure which tends to become equal with that of the air compressed by the separating piston during its vertical displacement; the release of the damper, on the other hand, is damped by the effect of a system of valves which partially stop the return orifices for the liquid, these valves being controlled, on the one hand by the pressure of the liquid forced back and, on the other hand, at the end of the run, by the separating piston itself.

Numerous other features of the damping device according to the invention appear from the following detailed description.

One type of embodiment of the object of the invention is represented, by way of non limitative example, in the appended drawing.

Figure 2 is a partial sectional elevation of the damper shown in Fig. 1, on a larger scale taken along line II—II in Figures 6 and 7.

Figure 4 is a sectional elevation similar to Figure 2, illustrating a characteristic position of the elements of the damper.

Figure 5 is a sectional elevation similar to Figure 3 but on a smaller scale, illustrating a characteristic position of the elements of the damper.

Figure 6 is a transverse section, on a smaller scale, taken along line VI—VI of Figure 3.

Figure 7 is a transverse section, on a smaller scale, taken along line VII—VII of Figure 3.

Figure 1:
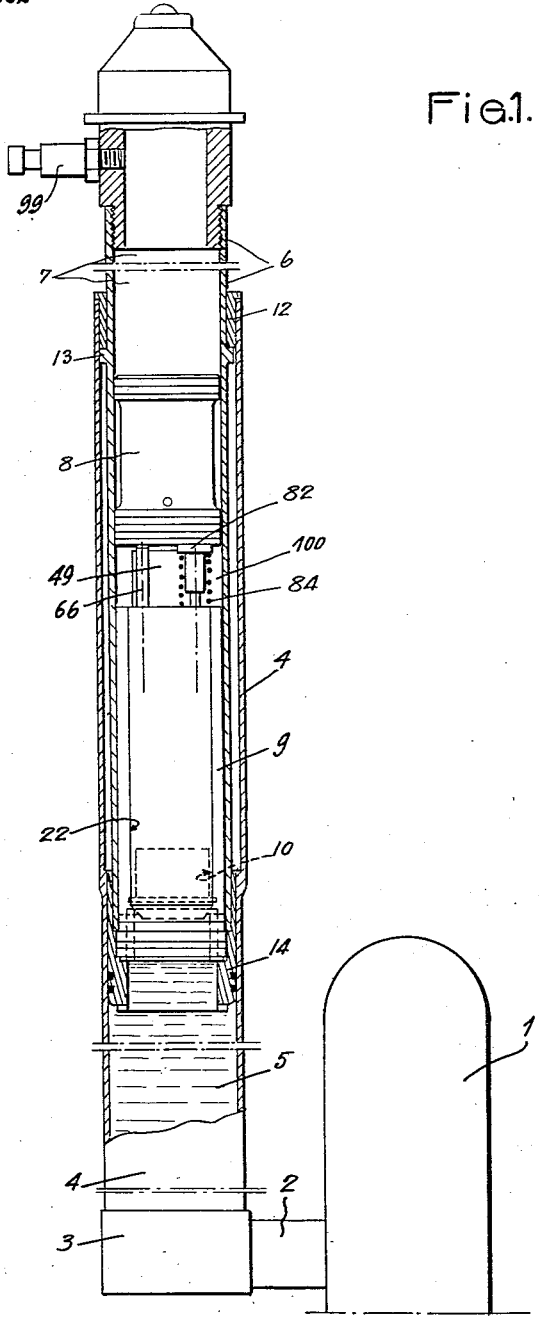
Figure 1 is a partly exploded diagrammatic elevation of a damper in accordance with the invention.

In Figure 1, 1 designates one of the wheels of a flying machine. This wheel is mounted in the usual manner on an axle-stub 2 which is attached to a support box 3. The support box 3 is nested and secured at the end of a hollow tubular element 4 partly filled with a liquid 5 which may be oil, for instance.

A second tubular element 6 is engaged telescopically into the tubular element 4.

The tubular element 6 forms a chamber 7, the lower portion of which is limited by a separating piston 8.

9 designates a regulating separator device which offers, at its lower portion, a valve 10; the function of this regulating device consists in causing the liquid, while restricting it, to pass alternately on both sides of its ends, so that this liquid causes the displacement of the separating piston 8 by compressing or allowing a partial expansion of the compressed air which is permanently enclosed in the chamber 7.

Figure 3:
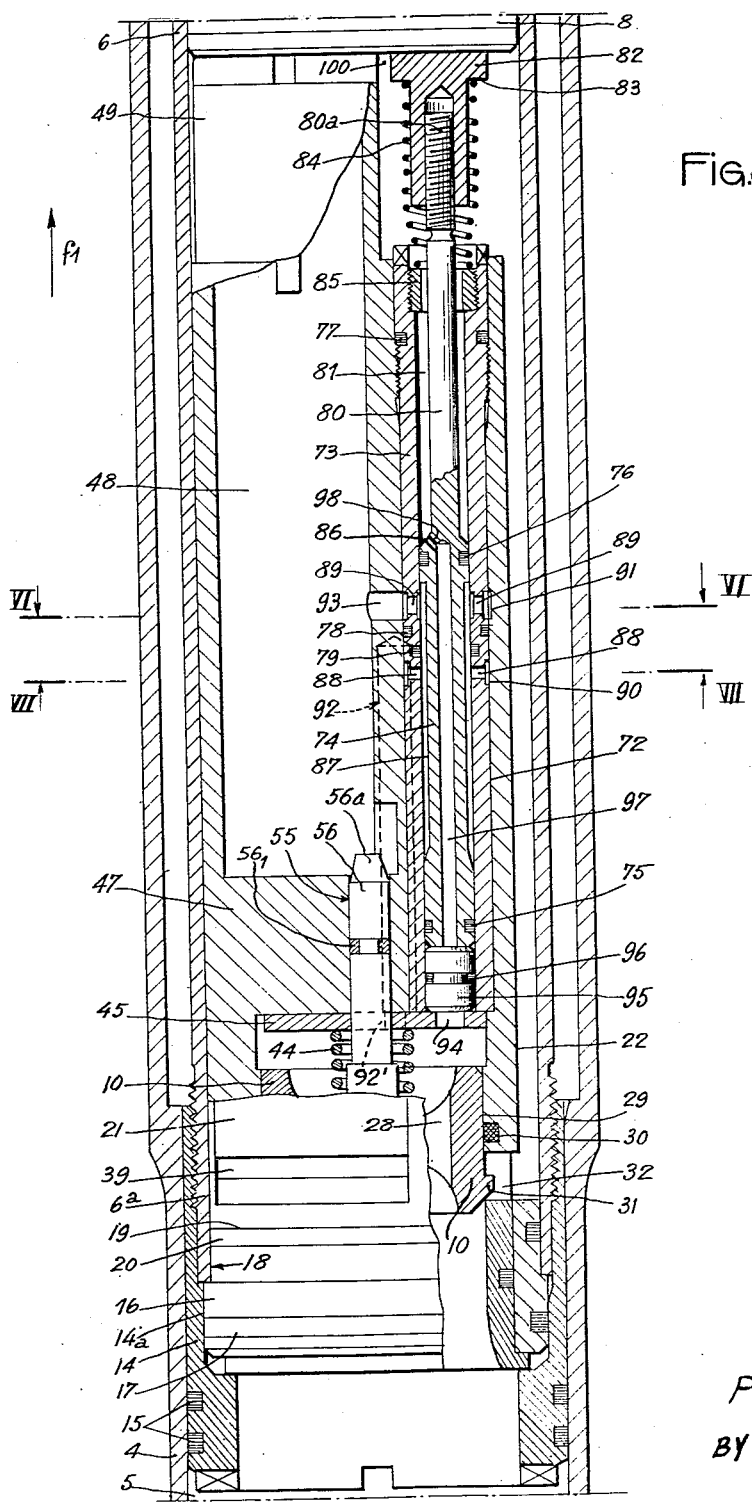
Figure 3 is a partial sectional elevation, on a larger scale taken along line III—III of Figures 6 and 7.

The regulating device 9 is shown in detail on a larger scale in Figures 2 and 3.

The upper end of the tubular element 4 offers a tapping in which a socket 12 is screwed, which is held locked by a screw 11. The socket 12 is used as a guide for the tubular element 6 and its end 12a cooperates with a projection 13 formed by the tubular element 6 for limiting the run of the two tubular elements 4 and 6 with respect to each other.

The end 6a of the tubular element 6 is associated with a sleeve 14 whose diameter is equal to the inner diameter of the tubular element 4, this sleeve being provided with packings 15 for ensuring a sealing between the tubular element 6 and the tubular element 4.

The sleeve 14 is so shaped inside as to offer a portion having a larger diameter 14a against which bears a part 16 which is provided with a seal 17.

The part 16 offers, back of the seal 17, a reduced portion 18 in which is provided a groove 19 serving as a housing for a seal 20 for ensuring a sealing between the part 16 and the end 6a of the tubular element 6. Above the seal 20, the part 16 has been grooved from its periphery so as to offer three flat lands 21, 22, 23 (Figures 3, 5, 6, 7).

A socket 24 (Figures 2 and 4) provided with a seal 25, is engaged into a bore 26 provided at the lower portion of the part 6 in such a manner that a marginal rim 27, formed by said socket, be engaged between the lower end of the part 16 and the annular rim formed between the two portions with different diameters of the sleeve 14, in order that said socket 24 be solidly held, so that its periphery 24a serves as a seat for the valve 10 shown in Figure 1.

The valve 10 consists of a cylindrical element which is provided with holes 28. It is guided inside a bore 29 of the part 16. 30 designates a seal interposed between the valve 10 and the part 16.

The lower portion of the valve forms a marginal rim, 31, for limiting its run, this rim moving, as explained hereinafter inside an annular chamber 32 which is in communication through elongated apertures 39 (Figures 3 and 5) with longitudinal passages 40, 41 and 42 (Figures 6 and 7), defined by the flat lands 21, 22 and 23 and the inner wall of the tubular element 6.

The valve 10 is held against its seat 24a by means of a small spring 44 which bears, on the one hand against said valve and on the other hand against a plate 45 secured by bolts 46, screwed into tappings provided to this effect in the body 47 of the part 16.

The body 47 of the part 16 is bored, from its upper end, with a cylindrical loading chamber 48 which is closed by a plug 49 provided with a seal 50.

The plug 49 is tapped so as to allow the screwing of a supporting part 51 for an element 52, such as a needle provided with a very small section capillary hole 53 (Figures 2 and 4).

54 designates a seal interposed between the supporting parts 51 and the plug 49.

A hole 55, drilled into the body 47 of the part 16 between the plate 45 which is drilled with a corresponding hole and the cylindrical chamber 48 serves as a housing for the tail piece 56 of the valve 10 which is provided with a seal 56₁.

The end 56a of the valve stem 10, as shown in the drawings, enters the chamber 48.

As shown in Figures 2, 4, 6 and 7, the body 47 of the part 16 offers a boring 57, provided with a hole 59 at its bottom 58 (Figures 2 and 4) partly stopped by a apertured plate 60 which is held against this bottom by a sleeve 61 at the lower of which bears the plate 45, described previously, which is bored with a hole 62.

The hole 62 and the apertured plate 60 are meant to allow a communication between the bore 57 and a lower chamber 63 defined by the lower portion of the tubular element 4 which contains the liquid 5.

The liquid contained in the capacity 63 can thus pass through the hole 28 of the valve 10, then through the hole 62 in the plate 45 and, after having gone through the apertured plate 60, be admitted in the bore 57. This bore serves as a housing for a sliding valve 64 guided by the fins 65 formed from its periphery. This valve 64 is associated with a rod 66 bearing, when the damping device is relaxed (position represented in Figure 2), against the bottom 67 of the separating piston 8.

The valve 64 is constantly pushed upwards by a spring 68 interposed between the bottom 58 and the lower portion of said valve.

The bore 57 is partly stopped, at its upper portion, by a hollow plug 69 which is screwed into a tapping 70 provided to this effect, said plug being designed to act as a seat, as shown in Figure 4, for the valve 64 when the damping device has been pushed in by a sufficient amount as explained hereinafter.

71 is a seal interposed between the plug 69 and the body 47 of the part 16. This body 47 is bored, as shown in Figures 3, 5, 6 and 7, with a second longitudinal bore 72 in which is engaged a jacket 73 inside which can slide a second sliding valve 74 which is provided, at its lower portion, with a seal 75 and at its middle portion with a second seal 76.

The jacket 73 is provided, on its outside, with two seals 77 and 78, and, inside, with a seal 79.

The second sliding valve 74 offers a portion with a smaller diameter 80, which defines an annular chamber 81 (Figure 3). The end 80a of the portion with the smaller diameter 80 of the second sliding valve 74 is screw threaded and screwed into a tapping of a part 82 which offers a rim 83 against which a spring 84 is bearing, working in compression, and which bears, at its other end, against a threaded sleeve 85 screwed into a tapping provided to this effect at the upper end of the jacket 73. The inner diameter of the sleeve 85 is larger than the outer diameter of the portion with the smaller diameter 80 of the second sliding valve 74 for allowing communication between an upper chamber 100 and the annular chamber 81.

The part 82 is bearing, with its upper face, against the bottom of the separating piston 8 and the length of that part and that of the portion 80 of the second sliding valve 74 is chosen slightly shorter than the length of the rod 66 of the sliding valve 64, so that the latter is a longer time in contact with the piston 8 during the push in run of the device. When the piston 8 has moved over a sufficient distance, the shoulder 86, defined between the portion of smaller diameter and the portion with the larger diameter of the second sliding valve 74 bears against the lower portion of the sleeve 85 which serves as a seat therefor.

The portion with the larger diameter, in the slide valve 74 i. e. the portion between the seals 75 and 76, has been reduced in diameter so as to define an annular chamber 87 which, when the damping device is in its relaxed position (Figures 2 and 3), is in communication with channels 88 bored in the jacket 73 and with channels 89 also bored in the jacket 73.

The channels 88 and 89 are respectively in communication with annular grooves 90 and 91, which are in communication, on the one hand, with a bore 92 and hole 92′ (Figures 3 and 7) connecting the channels 88 with the chamber 63 and, on the other hand, with a transverse channel 93 (Figures 3 and 6) connecting the channels 89 with the inside of the loading chamber 48.

The lower portion of the bore 72, in which the jacket 73 is arranged, is in communication with the lower chamber 63 through a hole 94 bored in the plate 45.

95 designates a small separating piston provided with a sealing packing 96 which is arranged inside the jacket 73 so as to prevent passage of fluid through the second sliding valve 74 between the chambers 63 and 100 but to allow said sliding valve to be subjected to the action of the pressure alternatively in chambers 63 and 100.

A channel 97, bored longitudinally in the portion having the larger diameter, in the second sliding valve 74, is in communication through a channel 98 with the annular chamber 81 defined by the portion having the smaller diameter in this slide valve, so that the liquid contained in the latter chamber may be brought between the upper face of the small piston 95 and the lower face of the sliding valve 74.

The above described damping device operates as follows:

As explained above, the inside of the tubular element 6 is filled with air, compressed to a suitable pressure. This is effected by means of a valve 99. All the rest of the damper i. e. the tubular element 4 and the lower portion of the tubular elements 6 up to the face 67 of the separating piston 8 is filled with oil.

When the damper is relaxed, i. e. when the aircraft on which it is mounted has not yet touched the ground, the various elements of the device are in the positions shown in Figures 2 and 3.

When the wheels, such as the wheels 1, touch the ground, the oil contained in the chamber 63 tends to escape and to raise the valve 10. The latter, however, is entirely balanced since the pressure obtained in the chamber 63 is transmitted through the holes 28 of the valve 10, the hole 92′; the bore 92 Figs. 3 and 7, the annular groove 90, the channels 88, the annular chamber 87, the channels 89, the annular groove 91 and the transverse channels 93 inside the loading chamber 48.

The oil, for escaping, is obliged to pass through the holes 28 in the valve 10, the hole 62 Fig. 2 in the plate 45, the apertured plate 60, which limits its flow, to be brought into the bore 57 and finally reach the upper chamber 100 defined by the upper portion of the body 47 of the part 16 and the lower face 67 of the separating piston 8 which is gradually pushed back in the direction of the arrow $f^1$.

The orifice or orifices bored in the apertured plate 60 being suitably calibrated, the oil is subjected to an intense laminating which causes a very important damping at the time of impact.

In step with the displacement of the separating piston, 8 in the direction of the arrow $f^1$, the first sliding valve 64 and the second sliding valve 74 follow this motion, inasmuch as their respective springs 68 and 84 keep the tail pieces 66 and element 82 against the face 67 of the piston 8.

The second sliding valve 74 is further subjected to the pressure in chamber 63 which acts on the separation piston 95 maintained in engagement with the lower end of said valve due to that pressure which is stronger than that in chamber 100 applied to the valve.

During the whole time of the motions of the first valve 64 and of the sliding valve 74, the operation remains the same as described above, i. e. the oil is obliged to flow through the apertured plate 60 only so that the pressure of the oil which is inside the lower chamber 63 increases gradually, which has the effect of increasing in the same proportions the pressure of the oil in the loading chamber 48 in communication through the ports 88, the annular chamber 87 and the bore 92, with the chamber 63.

The displacement of the separating piston 8 has the effect of compressing some more the air contained in the chamber 7 of the tubular element 6. When the separating piston has moved a sufficient distance, the shoulder 86 of the second sliding valve 74 bears against its seat 85 (position shown in Figure 5). In this position, the lower portion of larger diameter of said second sliding valve 74 is placed opposite the seal 79, which cuts off all communication between the channels 88 and 89, so that the communication between the chamber 63 and the loading chamber 48 is interrupted.

During the upward motion of the slide valve 74, the small separating piston 95 is also pushed due to the oil pressure which is exerted against its lower face.

The rod 66 of the first sliding valve 64 being slightly longer than that of the slide valve 74, the oil contained in the capacity 63 can still pass through the diaphragm 60 and be brought into the upper chamber 100. However, as soon as the separating piston 8 has moved a sufficient distance, the first valve 64 bears against its seat and the oil can no longer pass through the bore 57.

The oil contained in the lower chamber 63 being no longer able to flow through the apertured plate 60, when the first sliding valve 64 bears against its seat, this oil is obliged to lift the valve 10 so that it enters the annular chamber 32 then flows through the slots 39 in order to be able to flow through the passages 40, 41 and 42, to the upper chamber 100.

The flowing of the oil between the lower portion of the valve 10 and its seat causes an intense laminating of this oil as, for the valve 10 to be lifted, it is necessary that its tail piece 56 compress the oil contained in the loading chamber 48. This chamber being insulated from the rest of the damping device, the pressure obtained therein is substantially constant, as the leakage of oil through the capillary orifice 53 is negligible during the short time interval required for this operation, so that the damping during this period of operaton of the damping device is effected under a substantially constant reaction.

When the damping device extends, due to the fact, for instance, of an unevenness of the landing track, the valve 10 closes immediately under the action of the elasticity of the oil contained in the loading chamber 48 which acts as a spring and in the same direction as the spring 44. The second slide valve 74 remains in the position shown in Figure 5 as this slide valve is balanced, inasmuch as the oil contained in the upper chamber 100 can flow through the space separating the socket 85 from the portion of smaller diameter 80 of the second sliding valve 74, then through the small channel 98 to be finally admitted in the middle longitudinal channel 97 which has the effect of pushing back the small separating piston 95 while balancing the flap 74 since the pressure obtained inside the upper chamber 100 is also exerted on its lower face.

The small piston 95 preventing any passage of the oil from the channel 97 to chamber 63, the oil is prevented from flowing through the orifice 94 of the plate 45. Consequently the oil is obliged to pass from chamber 100 to chamber 63 to push back the first sliding valve 64 (Figs. 2 and 4) which compresses the spring 68 and partly closes the orifice of the apertured plate 60 while reducing the section of flow of the oil which is strongly laminated, which thus damps the return stroke of the device.

During the whole time of taxiing, the damper remains partly pushed in, due to the weight of the aircraft, so that the slide valve 74 remains constantly in the position shown in Figure 5, in which the communication between the lower chamber 63 and the loading chamber 48 is interrupted. Due to the leakage caused by the capillary orifice 53 a small amount of the oil contained in the chamber 48 flows into the upper chamber 100, so that during the taxiing period the pressure obtained inside the chamber 48 drops and consequently the laminating of the oil between the valve 10 and its seat is less intense and tends to cease, practically, which makes the suspension very smooth.

When the aircraft on which the damper thus described is mounted again takes off, the liquid contained inside the upper chamber 100 is gradually led back into the lower chamber 63 under the action of the air compressed inside the tubular element 6, which expands pushing back the separating piston 8.

The pushing back process takes place in the same manner as described above in connection with the expansion of the damper. When the separating piston 8, however, comes in contact with the part 82 associated with the end of the smaller diameter 80 of the second sliding valve 74 the latter is gradually pushed back to again occupy the position shown in Figure 3. The liquid which is between the upper face of the small piston 95 and the lower face of the valve 74 is brought back to the capacity 100 through the longitudinal channel 97, the channel 98 and the annular chamber 81.

As it appears from the above explanations, the damping effect is caused:

A. During the push in run of the device:

1. By the lamination of the liquid through the apertured plate 60 during the first part of the push in run of the device.

2. By the lamination of the liquid between the valve 10 and its seat after the closure of the valve 64 controlling the passage of liquid from chamber 63 to chamber 100 through the apertured plate 60, this second period of the damping effect occurring after the closure of ports 88, by the sliding valve 74, which takes place a short time before the closure of the valve 64, so that the pressure in the chamber 48 is no more balanced by that in chamber 63 allowing the lifting of the valve 10 compressing in part the liquid in chamber 48.

B. During the taxiing of the aircraft:

1. In a weak manner by lamination of the liquid between the valve 10 and its seat, since the chamber 48 is unloaded, the sliding valve 74 being at its upper position and closing the communication between the chambers 63 and 48. Further, the valve 64 being closed it prevents any passage of liquid from chambers 63 to 100. This occurs during new push-in runs of the device only.

2. In a strong manner during the return stroke, the liquid flowing from chamber 100 to chamber 63 through the apertured plate 60 partially closed by the valve 64 and its spring 68. Any passage of liquid between the valve 10 and its seat is prevented since the liquid in chamber 48 and the spring 44 act to close said valve.

C. During the expansion of the device:

1. In the first part of the expansion of the device its return stroke is produced in the same manner as during a return stroke occurring during taxiing, i. e. strong lamination of the liquid through the apertured plate 60.

2. When the piston 8 engages the parts 82 of the sliding valve 74 this latter is repulsed until it occupies the position of Fig. 3 for which the device is in position for a new landing.

The invention is not limited to the example of embodiment represented and described in detail as various modifications may be made thereto within its scope. In particular, it is easy to adjust the stiffness of the damper by merely changing the apertured plate 60 or only by varying by any means the section of its flow orifice or orifices.

What I claim is:

1. An oleo-pneumatic energy dissipating damping device, comprising a hollow tubular element, a second hollow tubular element telescopically engaged in the first hollow tubular element, a free piston located in the second hollow tubular element, said piston delimiting upper and lower sealed chambers, the upper chamber being filled with air and the lower chamber filled with a charge of liquid, a separating member associated with the lower part of the second hollow tubular element, said separating member delimiting on both of its sides upper and lower liquid filled chambers, said separating member having a longitudinal channel interconnecting said lower and upper liquid filled chambers, an apertured plate with calibrated hole closing in part the lowermost portion of said channel through which passes the liquid during the first part of the push-in run and the expansion run of the damping device, a sleeve having a bore smaller than the bore of the channel closing in part the uppermost portion of said channel, a movable valve in said channel, a spring urging said valve to the upper part of the channel, a rod secured to the movable valve and bearing against the free piston during the first part of the push-in run of the damping device to maintain said movable valve in a position for which the liquid flows from the lower to the upper liquid filled chamber, said valve closing said channel at the end of the first part of the push-in run, a loaded valve located at the lowermost part of the separating member, said loaded valve having apertures through which the liquid may flow, a rod secured to the valve, a spring urging downwardly the valve, the separating member comprising a loading chamber in which enters the rod secured to the valve, a cap provided with a capillary aperture located at the upper part of the separating member so that said loading chamber communicates with the upper liquid filled chamber through the capillary aperture, means putting the loading chamber in which enters the rod secured to the loaded valve in communication with the lower liquid filled chamber during the first part of the push-in run of the damping device to load said loaded valve, a seat for said loaded valve, said seat, separating elements and second hollow tubular element delimiting apertures and longitudinal passages putting in communication the lower and upper liquid filled chambers when the loaded valve lifts off after the first part of the push-in run of the damping device.

2. An oleo-pneumatic energy dissipating damping device, comprising a hollow tubular element, a second hollow tubular element telescopically engaged in the first hollow tubuuar element, a free piston located in the second hollow tubular element, said piston delimiting upper and lower sealed chambers, the upper chamber being filled with air and the lower chamber filled with a charge of liquid, a separating member associated with the lower part of the second hollow tubular element, said separating member delimiting on both of its sides, upper and lower liquid filled chambers, said separating member comprising a longitudinal channel, interconnecting said lower and upper liquid filled chambers, an apertured plate with calibrated hole closing in part the lowermost portion of said channel through which passes the liquid during the first part of the push-in run and the expansion run of the damping device, a sleeve having a bore smaller than the bore of the channel closing in part the uppermost portion of said channel, a movable valve in said channel, a spring urging said valve to the upper part of the channel, a rod secured to the movable valve and bearing against the free piston during the first part of the push-in run of the damping device to maintain said valve in a position for which the liquid flows from the lower to the upper liquid filled chamber, said valve closing said channel at the end of the first part of the push-in run, a loaded valve located at the lowermost part of the separating member, said loaded valve comprising apertures by which the liquid may flow, a rod secured to the loaded valve, a spring urging downwardly said loaded valve, the separating member comprising a loading chamber in which enters the rod secured to the loaded valve, a cap provided with a capillary aperture located at the upper part of the separating member so that said loading chamber communicates with the upper liquid filled chamber through the capillary aperture, a sliding valve subjected on both sides to the pressure in the upper liquid filled chamber, the separating member having longitudinal bore for that sliding valve, a small free separator piston located in said longitudinal bore under the sliding valve and submitted by its lower side to the pressure in the lower liquid filled chamber, the sliding valve delimiting with the separating member an annular chamber for the passage of the liquid from the lower liquid filled chamber to the loading chamber during the first part of the push-in run, said separating member having holes and apertures interconnecting said lower liquid filled chamber, said annular chamber and said loading chamber, a spring urging the upper part of the sliding valve against the free piston sliding in the second hollow tubular element during the first part of the push-in run and moving said sliding valve during the push-in run to cut off communication to said loading chamber to provide additional loading to said loaded valve, a seat for said loaded valve, said seat, separating elements and second hollow tubular element delimiting apertures and longitudinal passages putting in communication the lower and upper liquid filled chambers when the loaded valve lifts off after the first part of the push-in run of the damping device.

3. An oleo-pneumatic energy dissipating damping device, comprising a hollow tubular element, a second hollow tubular element telescopically engaged in the first hollow tubular element, a free piston located in the second hollow tubular element, said piston delimiting upper and lower sealed chambers, the upper chamber being filled with air and the lower chamber filled with a charge of liquid, a separating member associated with the lower part of the second hollow tubular element, said separating member delimiting on both of its sides upper and lower liquid filled chambers, said separating member having a longitudinal channel interconnecting said lower and upper liquid filled chambers, an apertured plate with calibrated hole closing in part the lowermost portion of said channel through which passes the liquid during said first part of the push-in run and the expansion run of the damping device, a sleeve having a bore smaller than the bore of the channel closing in part the uppermost portion of said channel, a movable valve in said channel, a spring urging said valve to the upper part of the channel, a rod secured to the movable valve and bearing against the free piston during the first part of the push-in run of the damping device to maintain said valve in a position for which the liquid flows from the lower to the upper liquid filled chamber, said valve closing said channel at the end of the first part of the push-in run, a loaded valve located at the lowermost part of the separating member, said loaded valve having apertures through which the liquid may flow, a rod secured to the loaded valve, a spring urging downwardly said latter valve, the separating member having a loading chamber in which enters the rod secured to the loaded valve, a cap provided with a capillary aperture located at the upper part of the separating member so that said loading chamber communicates with the upper liquid filled chamber through the capillary aperture, a sliding valve located in a longitudinal bore of the separating member and bearing against the free piston during a portion of the first push-in run, a small separator free piston located in the longitudinal bore under the sliding valve and submitted by its lower side to the pressure in the lower liquid filled chamber, said separating member having holes and apertures interconnecting said lower liquid filled chamber, said longitudinal bore and said loading chamber, the sliding valve delimiting with the separating member an annular chamber for the passage of the liquid through said holes and apertures from the lower liquid filled chamber to the loading chamber during a portion of the first part of the push-in run, a rod associated with the upper part of the sliding valve, said rod being shorter than the rod secured to the movable valve and extending through the channel by which passes the liquid during the first part of the push-in run so that the sliding valve isolates said loading chamber from the lower liquid filled chamber before the closure of the channel by which passes the liquid during the first part of the push-in run, a spring urging the rod associated with the sliding valve against said free piston, a seat for said loaded valve, said seat, separating elements and second hollow tubular element delimiting apertures and longitudinal passages putting in communication the lower and upper liquid filled chambers when the loaded valve lifts off after the first part of the push-in run of the damping device.

4. An oleo-pneumatic energy dissipating damping device comprising a hollow tubular element, a second hollow tubular element telescopically engaged in the first hollow tubular element, a free piston located in the second hollow tubular element, said piston delimiting upper and lower sealed chambers, the upper chamber being filled with air and the lower chamber filled with a charge of liquid, a separating member associated with the lower part of the second tubular element, said separating member delimiting on both of its sides upper and lower liquid filled chambers, said separating member having a longitudinal channel interconnecting said lower and upper liquid filled chambers, an apertured plate with calibrated hole closing in part the lowermost portion of said channel through which passes the liquid during the first part of the push-in run and the expansion run of the damping device, a sleeve having a bore smaller than the bore of the channel closing in part the uppermost portion of said channel, a movable valve in said channel, a spring urging said valve to the upper part of the channel, a rod secured to the movable valve and bearing against the free piston during the first part of the push-in run of the damping device to maintain said valve in a position for which the liquid flows from the lower to the upper liquid filled chamber, said valve closing said channel at the end of the first part of the push-in run, a loaded valve located at the lowermost part of the separating member, said loaded valve having apertures through which the liquid may flow, a rod secured to the loaded valve, a spring urging downwardly said latter valve, the separating member having a loading chamber in which enters the rod secured to the loaded valve, a cap provided with a capillary aperture located at the upper part of the separating member, so that said loading chamber communicates with the upper liquid filled chamber through the capillary aperture, a sliding valve located in a longitudinal bore of the separating member and bearing against the free piston during a portion of the first push-in run, a small free separator piston, located in said longitudinal bore, under the sliding valve, said piston having its lower face submitted to the pressure in the lower liquid filled chamber and its upper face submitted to the pressure in the upper liquid filled chamber, said separating member having holes and apertures interconnecting said lower liquid filled chamber, said longitudinal bore and said loading chamber, the sliding valve delimiting with the separating member an annular chamber for the passage of the liquid from the lower liquid filled chamber to the loading chamber through said holes and apertures during a portion of the first part of the push-in run, said sliding valve having at its lower part a portion of larger diameter preventing the passage of the liquid between the lower liquid filled chamber and the loading chamber for unloading the loaded valve before the closing of the movable valve at the end of the first part of the push-in run and moving said sliding valve during the push-in run to cut off communication to said loading chamber to provide additional loading to said loaded valve, a seat for said loaded valve, said seat, separating elements and second hollow tubular element delimiting apertures and longitudinal passages putting in communication the lower and upper liquid filled chambers when the loaded valve lifts off after the first part of the push-in run of the damping device.

5. An oleo-pneumatic energy dissipating damping device, comprising a hollow tubular element, a second hollow tubular element telescopically engaged in the first hollow tubular element, a free piston located in the second hollow tubular element, said piston delimiting upper and lower sealed chambers, the upper chamber being filled with air and the lower chamber filled with a charge of liquid, a separating member associated with the lower part of the second hollow tubular element, said separating member delimiting on both of its sides upper and lower liquid filled chambers, said separating member having a longitudinal channel interconnecting said lower and upper liquid filled chambers, an apertured plate with calibrated hole closing in part the lowermost portion of said channel through which passes the liquid during the first part of the push-in run and the expansion run of the damping device, a sleeve having a bore smaller than the bore of the channel, closing in part the uppermost portion of said channel, a movable valve in said channel, a spring urging said valve to the upper part of the channel, a rod secured to the movable valve and bearing against the free piston during the first part of the push-in run of the damping device to maintain said valve in a position for which the liquid flows from the lower to the upper liquid filled chamber, said valve closing said channel at the end of the first push-in run, a loaded valve located at the lowermost part of the separating member, said loaded valve having apertures through which the liquid may flow, a rod secured to the loaded valve, a spring urging downwardly the loaded valve, the separating member having a loading chamber in which enters the rod secured to the loaded valve, a cap provided with a capillary aperture located at the upper part of the separating member so that said loaded chamber communicates with the upper liquid filled chamber through the capillary aperture, a sliding valve located in a longitudinal bore of the separating member and bearing against the free piston during a portion of the first push-in run, a small free separator piston, located in said longitudinal bore, under the sliding valve, said piston having its lower face submitted to the pressure in the lower liquid filled chamber and its upper face submitted to the pressure in the upper liquid filled chamber, the sliding valve delimiting with the separating member an annular chamber, said separating member having holes communicating with said annular chamber and the lower liquid filled chamber and apertures between said loading chamber and said annular chamber so that the pressure in the lower liquid filled chamber is transmitted inside the loading chamber during a portion of the first part of the push-in run, said sliding valve having at its lower part a portion of larger diameter preventing the passage of the liquid between the lower liquid filled chamber and the loading chamber before the movable valve, the rod of which is urged against the free piston, closes the channel in which it slides, a seat for said loaded valve, said seat, separating elements and second hollow tubular element delimiting apertures and longitudinal passages putting in communication the lower and upper liquid filled chambers when the loaded valve lifts off after the first part of the push-in run of the damping device.

6. An oleo-pneumatic energy dissipating damping device, comprising a hollow tubular element, a second hollow tubular element telescopically engaged in the first hollow tubular element, a free piston located in the second hollow tubular element said piston delimiting upper and lower sealed chambers, the upper chamber being filled with air and the lower chamber filled with a charge of liquid, a separating member associated with the lower part of the second hollow tubular element, said separating member delimiting on both of its sides upper and lower liquid filled chambers, said separating member comprising a longitudinal channel interconnecting said lower and upper liquid filled chambers, an apertured plate with calibrated hole closing in part the lowermost portion of said channel through which passes the liquid during the first part of the push-in run and the expansion run of the damping device, a sleeve having a bore smaller than the bore of the channel closing in part the uppermost portion of said channel, a movable valve in said channel, a spring urging said valve to the upper part of the channel, a rod secured to the movable valve and bearing against the free piston during the first part of the push-in run of the damping device to maintain said valve in positions for which the liquid flows from the lower to the upper liquid filled chamber, said valve closing said channel at the end of the first part of the push-in run, a loaded valve located at the lowermost part of the separating member, said loaded valve having apertures through which the liquid may flow, a rod secured to said loaded valve, a spring urging downwardly the loaded valve, the separating member comprising a loading chamber in which enters the rod secured to the loaded valve, a cap provided with a capillary aperture located at the upper part of the separating member so that said loading chamber communicates with the upper liquid filled chamber through the capillary aperture, said separating member having a longitudinal bore, a sliding valve in said longitudinal bore of said separating member, a rod associated with the upper part of the sliding valve, said rod being shorter than the rod secured to the movable valve sliding in the channel by which passes the liquid during the first part of the push-in run so that said sliding valve is in closure position when the movable valve closes the channel by which passes the liquid during the first part of the push-in run, a spring urging the rod associated with the sliding valve against said free piston, a small free separator piston located in said longitudinal bore under the sliding valve, said small piston having its lower face submitted to the pressure in the lower liquid filled chamber and its upper face submitted to the pressure in the upper liquid filled chamber, the sliding valve delimiting with the separating member an annular chamber, said separating member having holes communicating with said annular chamber and the lower liquid filled chamber and apertures between said loading chamber and said annular chamber so that the pressure in the lower liquid filled chamber is transmitted inside the loading chamber during a portion of the first part of the push-in run, said sliding valve having at its lower part a portion of larger diameter preventing the passage of the liquid between the lower liquid filled chamber and the loading chamber before the movable valve closes the channel in which it slides, said sliding valve having an inner longitudinal channel interconnecting its lowermost portion and the upper liquid filled chamber, so that said sliding valve is equilibrated during expansion of the damping device and remains in closure position, a seat for said loaded valve, said seat, separating elements and second hollow tubular element delimiting apertures and longitudinal passages putting in communication the lower and upper liquid filled chambers when the loaded valve lifts off after the first part of the push-in run of the damping device.

7. An oleo-pneumatic energy dissipating damping device comprising a first hollow tubular element and a second hollow tubular element telescopically engaged in said first hollow tubular element, a free piston in said second hollow tubular element, a charge of gas on one side of said free piston and a charge of liquid on the other side of said free piston, a partition or separating element in said second hollow tubular element delimiting therein two liquid filled chambers, said partition having a calibrated passage for the passage of the liquid from one to the other liquid filled chamber, movable means located in said calibrated passage and controlled by said free piston to close said calibrated passage for a portion of the push-in run of the damping device, said partition having longitudinal passages interconnecting said two liquid filled chambers, a valve carried by said partition and controlling said longitudinal passages, said partition having an inner balancing chamber in which said valve is partially located and a capillary aperture for the communication of said inner chamber with the liquid filled chamber into which liquid is transmitted during the push-in run of the damping device through said calibrated passage, said partition having moreover a channel for the communcation of the other liquid filled chamber with the inner chamber, and a movable system controlled by said free piston to close the communication between said latter liquid filled chamber and said inner balancing chamber before the closure of said calibrated passages.

References Cited in the file of this patent
UNITED STATES PATENTS

| | | |
|---|---|---|
| 2,308,404 | Thornhill | Jan. 12, 1943 |
| 2,366,248 | Focht | Jan. 2, 1945 |
| 2,381,532 | Focht | Aug. 7, 1945 |
| 2,445,139 | Gret | July 13, 1948 |
| 2,475,477 | Chausson | July 5, 1949 |
| 2,540,708 | Bowden et al. | Feb. 6, 1951 |